(No Model.) 6 Sheets—Sheet 1.

G. E. HUNTER.
DIAL SINKING MACHINE.

No. 527,988. Patented Oct. 23, 1894.

Witnesses:
Jas. E. Hutchinson.
Henry C. Hazard.

Inventor.
George E. Hunter, by
Pindle and Russell, his Attorneys (No Model.)

G. E. HUNTER.
DIAL SINKING MACHINE.

No. 527,988. Patented Oct. 23, 1894.

Witnesses:
Jas. C. Hutchinson.
Henry C. Hazard.

Inventor.
George E. Hunter, by
Brindle & Russell, his Attorneys (No Model.) 6 Sheets—Sheet 3.

G. E. HUNTER.
DIAL SINKING MACHINE.

No. 527,988. Patented Oct. 23, 1894.

Witnesses:
Jas. E. Hutchinson.
Henry C. Hazard.

Inventor.
George E. Hunter, by
Rundle & Russell, his Attorneys (No Model.)  6 Sheets—Sheet 5.
G. E. HUNTER.
DIAL SINKING MACHINE.
No. 527,988. Patented Oct. 23, 1894.
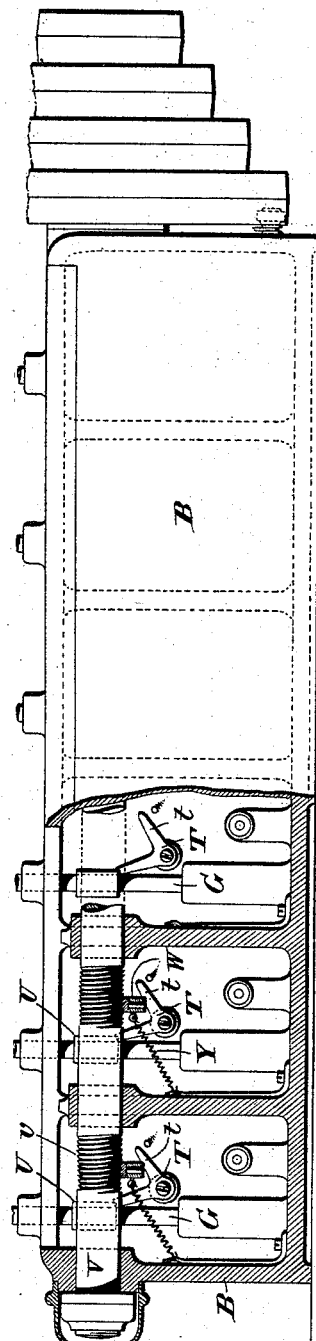
Fig. 5
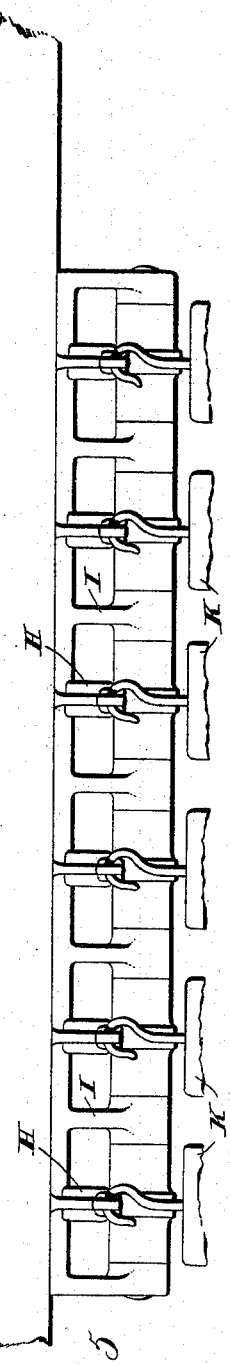
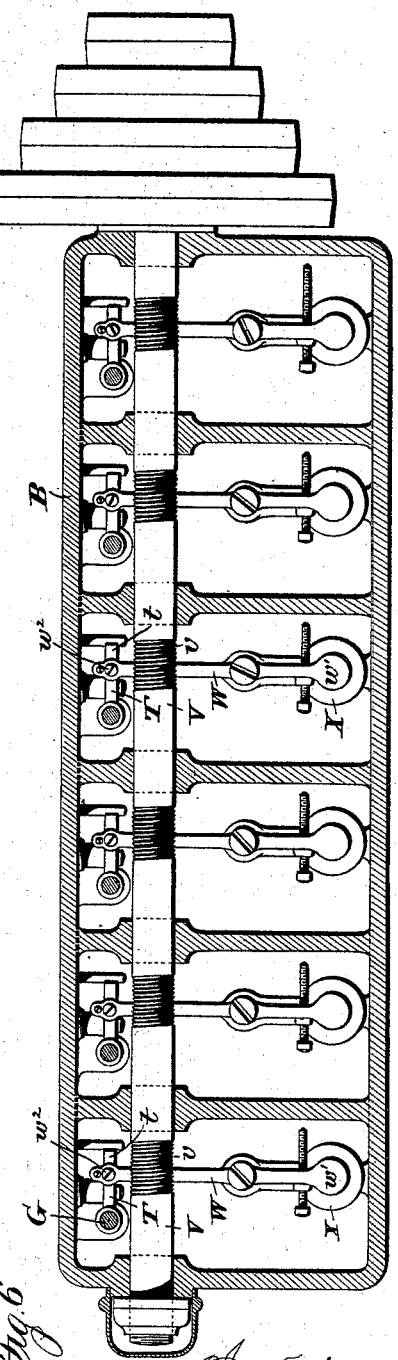
Fig. 6
Witnesses:
Jas. E. Hutchinson
Henry C. Hazard
Inventor
George E. Hunter, by
Dindle and Russell, his Attorneys (No Model.)  6 Sheets—Sheet 6.

G. E. HUNTER.
DIAL SINKING MACHINE.

No. 527,988. Patented Oct. 23, 1894.

Witnesses:
Jas. E. Hutchinson.
Henry C. Hazard.

Inventor.
George E. Hunter, by
Crindle and Russell, his Attorneys

THE NORRIS PETERS CO., PHOTO-LITHO., WASHINGTON, D. C.

UNITED STATES PATENT OFFICE.

GEORGE E. HUNTER, OF ELGIN, ILLINOIS, ASSIGNOR TO THE ELGIN NATIONAL WATCH COMPANY, OF CHICAGO, ILLINOIS.

DIAL-SINKING MACHINE.

SPECIFICATION forming part of Letters Patent No. 527,988, dated October 23, 1894.

Application filed February 1, 1894. Serial No. 498,762. (No model.)

*To all whom it may concern:*

Be it known that I, GEORGE E. HUNTER, of Elgin, in the county of Kane, and in the State of Illinois, have invented certain new and useful Improvements in Dial-Sinking Machines; and I do hereby declare that the following is a full, clear, and exact description thereof, reference being had to the accompanying drawings, in which—

Figure 1:
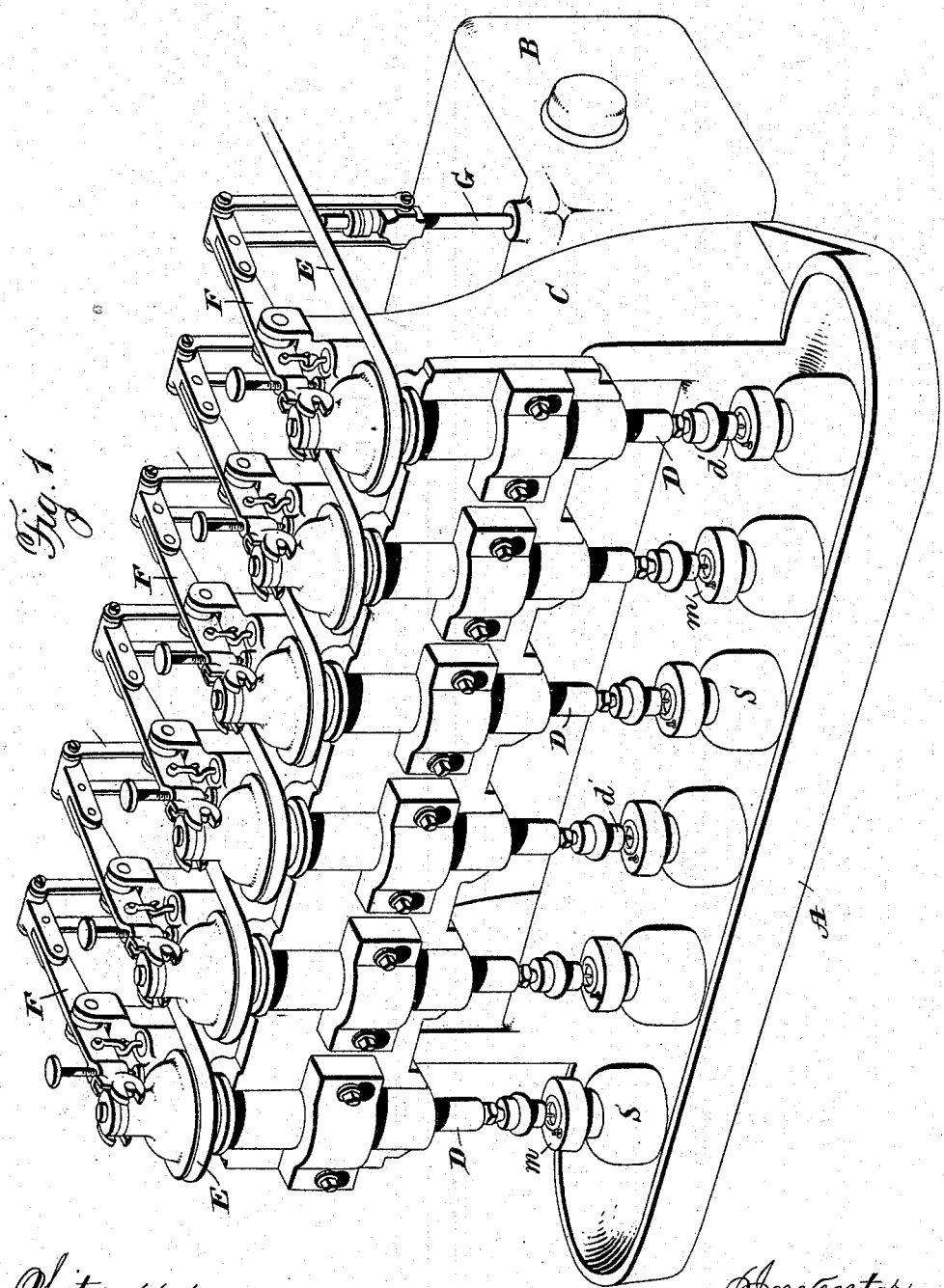
Figure 2:
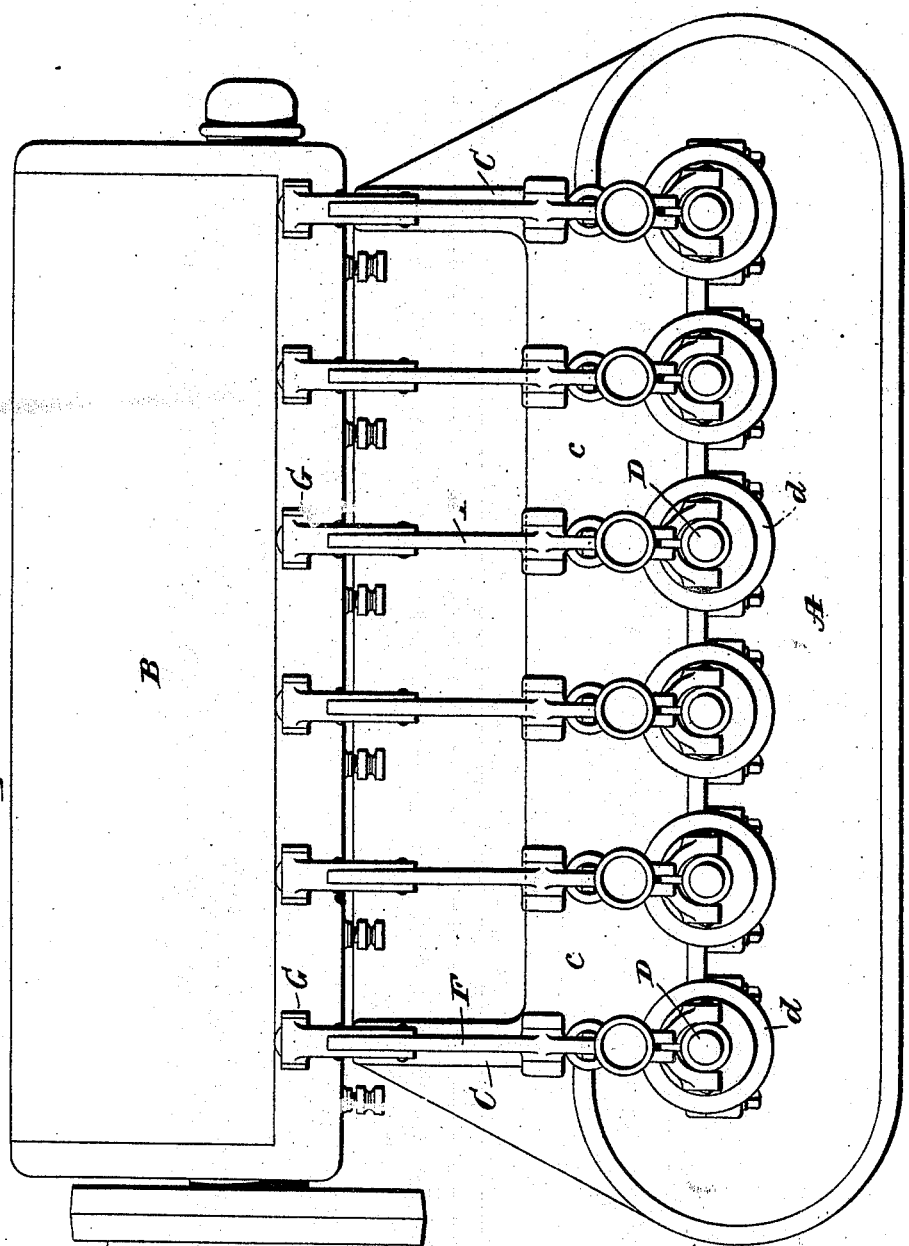
Figure 3:
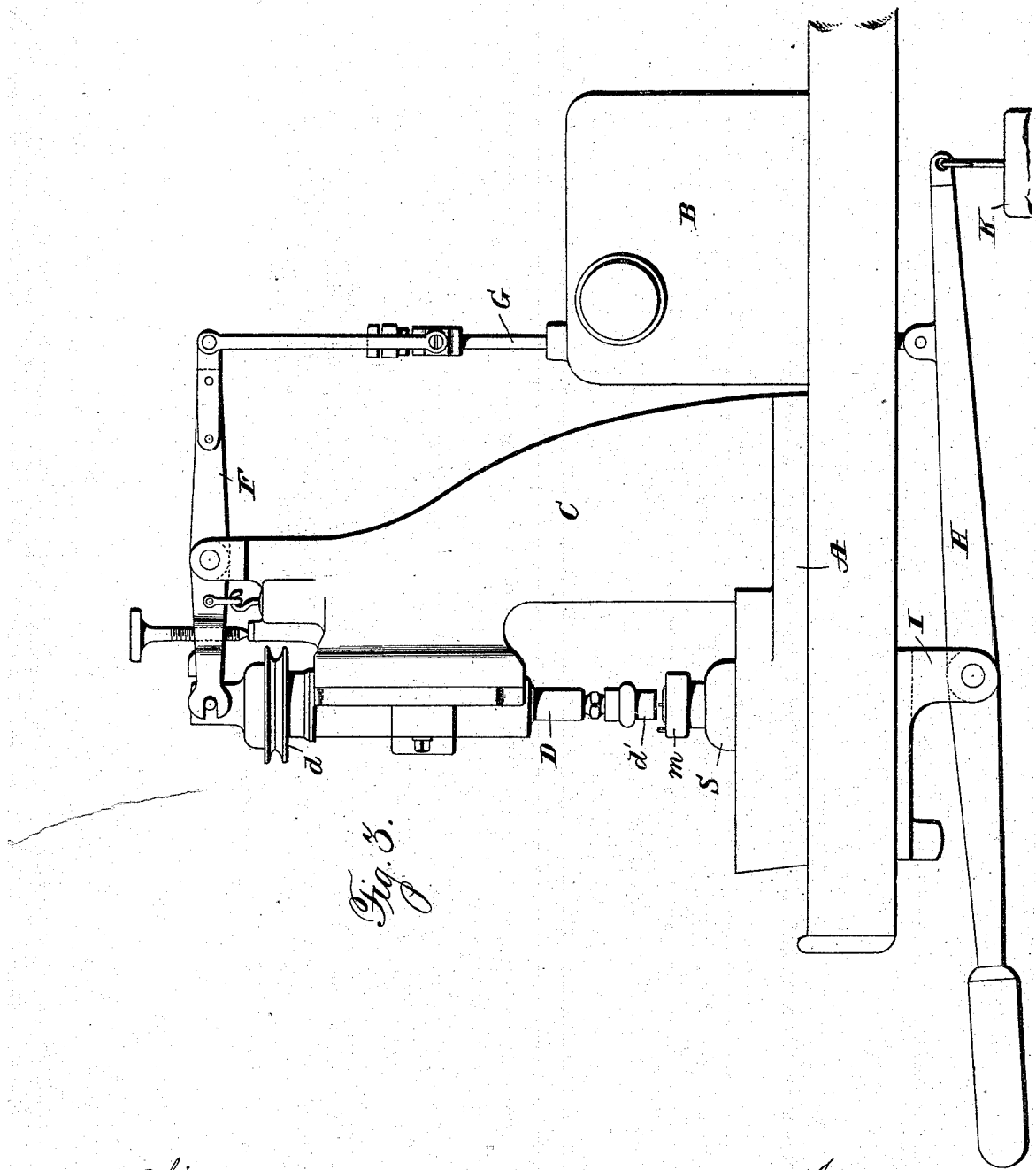
Figure 4:
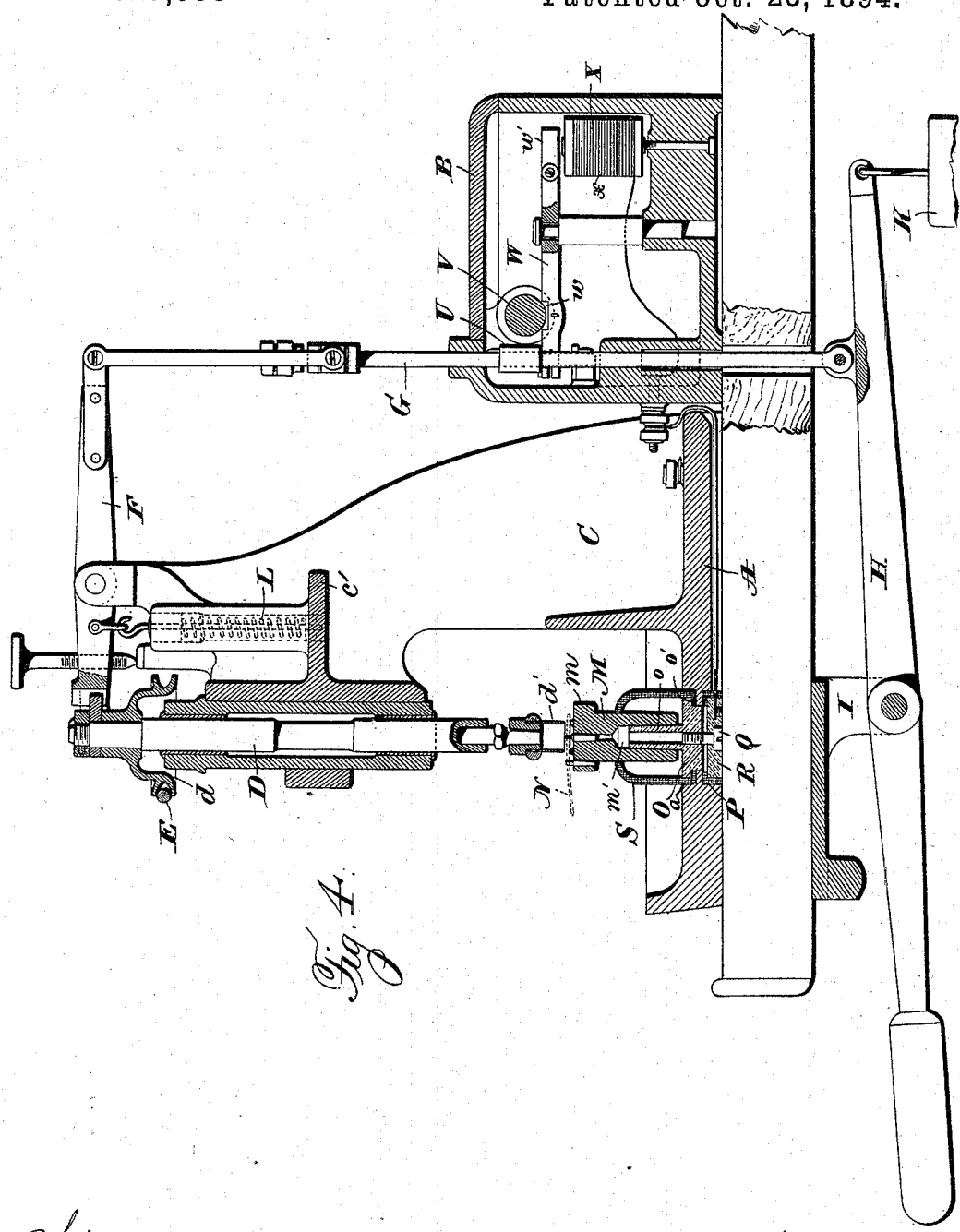
Figure 7:
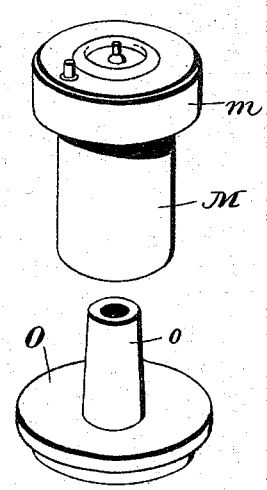
Figure 8:
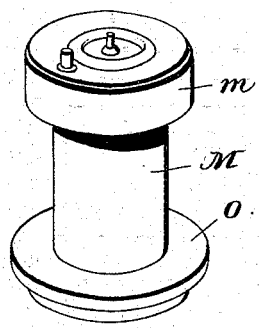
Figure 9:
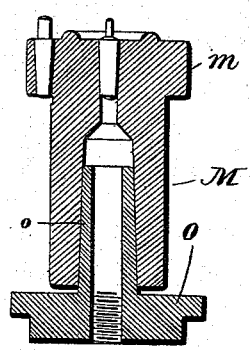
Figure 10:
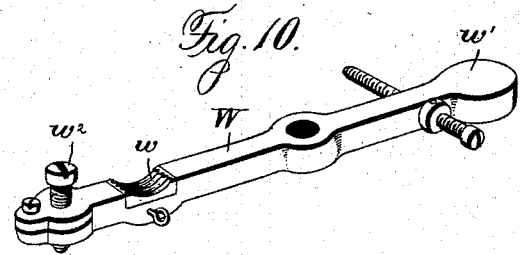

Figure 1 is a perspective view of my machine as arranged for use. Fig. 2 is a plan view of the same from the upper side. Fig. 3 is an end elevation of the mechanism. Fig. 4 is a vertical section upon a line passing from front to rear through one of the spindles and its operating devices. Fig. 5 is an elevation from the rear side of the housing with a portion of the same in vertical section. Fig. 6 is a horizontal section of said housing above the shaft and its connecting mechanism. Fig. 7 is an enlarged perspective view of the parts composing the dial support, separated from each other. Fig. 8 is a like view of the same when combined. Fig. 9 is a vertical central section of said support. Fig. 10 is an enlarged, perspective view of the releasing lever.

Letters of like name and kind refer to like parts in the several figures.

The design of my invention is to provide a dial sinking machine whose operation shall be automatic, and to this end, said invention consists in the machine and in the parts thereof, constructed and combined substantially as and for the purpose hereinafter specified.

In the carrying of my invention into practice I employ for the support of the operative mechanism a base plate A, that at and across its rear side is provided with a rectangular housing B and between the same and the front edge of said base is secured a frame composed of two standards C and C which are connected together and furnish a support for a number of equi-distant bearings $c$ and $c$ that have each such construction as to enable it to receive and contain a vertical revoluble and longitudinally movable spindle D.

The spindle D is preferably rotated by means of a round belt E that passes around a grooved pulley $d$ near the upper end of the same and is moved vertically by means of a lever F which is pivoted within the upper, rear portion of the frame with its front, forked end swiveled upon the upper end of said spindle. To the rear end of said lever is loosely connected a rod G which from thence extends downward through the housing B and at its lower end is pivoted upon the rear end of a second lever H, which latter extends forward beyond the base plate A and at or near its longitudinal center is pivoted upon a suitable support I. As thus arranged, by pressing down upon the front end of said lever H said spindle D will be depressed longitudinally. A weight K suspended from the rear end of said lower lever operates when not restrained, to raise the spindle and its cutter $d'$, while a spring L extending between said upper lever F and a lug $c'$ upon the frame acts, when permitted so to do by the restraint of the weight, to give to said spindle a sufficient downward pressure to enable its cutter to operate.

At a point directly below and in axial line with each spindle D is a dial table M, which, as seen in Figs. 7, 8 and 9, consists of a cylindrical metal part provided at its upper end with a head $m$ that is adapted to receive and support a watch dial N, and to confine such dial in position to enable the cutter $d'$ to operate. The body of such table is provided with an axial opening $m'$ which passes over a correspondingly shaped tubular part $o$ that projects upward from a block O, the arrangement being such as to enable said table to be removed and replaced by another adapted for a different kind or size of dial. The block O is provided within its lower corner with a right angle rabbet $o'$ and is loosely fitted into a correspondingly shaped opening $a$ in the base plate A, a ring of rubber P, or other suitable insulating material, being interposed between said parts, as shown. Said block is secured in place by means of a screw Q which passes upward through a similarly insulated washer R and has its threaded end contained within a correspondingly threaded opening in said block. A cylindrical casing S constructed from insulated material is preferably placed around the body of said table and its support, and extends downward into the recess which contains said block O and operates to shield the parts from dirt and moisture.

When the rod G has been raised so as to enable the cutter $d'$ to operate, it is locked in its elevated position by means of a dog T which is pivoted within the housing, and by the action of a spring is caused to automatically engage with a collar U upon said rod. The connection between the latter and the lever F is such as to permit a considerable amount of independent action to the spindle D and its cutter $d'$ and the combined action of the weight of said parts and of the spring L gives to such cutter all pressure necessary to enable it to cut through the enamel of a dial. After the enamel has been cut through so that only the copper base remains to be removed, the action of the cutter is arrested by the following, described means, viz:—Within the housing B, in the rear of the rods G and G is a continuously rotating shaft V that is journaled horizontally, and adjacent to each of said rods, is provided with a threaded section $v$. In a line with each threaded section is a lever W which extends horizontally from near the front side to near the rear side of said housing and is pivoted at or near its center so as to be capable of both vertical and horizontal movements and at a point directly beneath said threaded section, has formed within its upper face, a half nut $w$ that is adapted to engage with the latter when said lever has its rear end pressed downward, in which event the front end of said lever will be moved laterally and caused to engage with an arm $t$ of the dog T so as to trip the latter and thereby release the rod G and permit the cutter spindle D to be raised so as to remove its cutter $d$ from contact with the dial.

Upon the rear end of the lever W is secured an armature $w'$ and beneath the same is provided an electro-magnet X, which magnet operates to depress the rear end of said lever and to cause its nut $w$ to engage with the threaded section $v$ of the shaft V whenever an electric current is passed through the coils $x$ of the magnet. Said coils are connected electrically with the cutter $d$ through the spindle D, and the frame and with the table M through the block O, screw Q and washer R so that when said cutter has cut through the enamel of a dial and touches the copper back of the same, which rests upon said table, such contact closes the electric circuit and causes the tripping lever W to engage with the threaded portion of the shaft V and be moved laterally until the locking dog T is tripped and the spindle and cutter raised. As soon as contact ceases between said cutter and the dial back, the electro magnet is demagnetized, and said lever released, when by the action of a spring Y the latter is returned to its normal position.

In practice, it is found that the first contact between the cutter and the dial back is at one point only, instead of around the entire end of such cutter, for which reason the action of such cutter is permitted to continue for a brief period so as to insure the removal of such enamel around the entire line of the cut.

The time intervening between the closing of the circuit and the withdrawal of the cutter is governed by the amount of lateral travel of the shifting lever W before it impinges upon and trips the pawl or dog T and such time is varied by the speed of the shaft V or by means of a set screw $w^2$ which passes through the front end of said lever and forms an adjustable contact point between the same and the arm $t$ of said dog.

If desired, instead of the construction shown the spindle D may be insulated and connected electrically with and form one of the terminals of the circuit and the table—not insulated—form the other terminal, its connection being through the frame of the machine.

Having thus described my invention, what I claim is—

1. The combination of a work support, a tool, means for feeding the latter to its work, a stopping mechanism, and means controlled by the relative position of tool and work that set such stopping mechanism in motion before the work of the tool is to be stopped whereby the operation of the tool may continue for an interval after said mechanism has been put in motion, substantially as and for the purpose specified.

2. In a dial-sinking machine, the combination of a suitable dial support, a cutting tool, means to automatically feed the cutter to its work, and means controlled by the dial being operated upon for automatically removing it from the dial when it has cut to a predetermined point, substantially as and for the purpose shown.

3. In a dial-sinking machine, the combination of a suitable dial support, a cutting tool, an electric circuit adapted to be closed and opened by said parts, an electro-magnet in said circuit and a stop mechanism under the control of the latter, substantially as and for the purpose described.

4. In a dial sinking machine, the combination of a dial support, a cutting tool, an electric circuit including these parts and a magnet, and a mechanism to stop the cutting that is set in motion by the closing of the circuit a predetermined interval before such cutting is to be stopped, substantially as and for the purpose set forth.

5. In a dial sinking machine, the combination of a dial support, a cutting tool, means to move the latter toward the former, means to move said tool away from the support, a stop to restrain the latter means, and mechanism to release said stop, substantially as and for the purpose shown.

6. In a dial-sinking machine the combination of a dial support, a cutter carrying spindle, a lever for moving the latter longitudinally a spring to move the spindle in one direction, a weight to move it in the other, a stop device to restrain its movement by the weight, and means to release said stop, substantially as and for the purpose described.

7. The combination of a work holder, a tool, and a stop mechanism comprising a shaft having a threaded section, a lever movable into and out of contact with the latter, and a locking dog adapted to be tripped by said lever, substantially as and for the purpose shown.

8. The combination of a work holder, a tool, means acting normally to remove the latter from the former, a stop to restrain said means, and a releasing mechanism comprising a threaded shaft and a lever having a threaded portion that is movable into and out of engagement with the thread of the shaft, substantially as and for the purpose set forth.

9. The combination of the longitudinally movable tool-carrying spindle, a weighted lever for moving it to remove the tool from work, a stop to restrain the movement of said lever, a shaft having a threaded section, a lever threaded to engage the latter, and an electro magnet to cause such engagement that is in a circuit controlled by said spindle, substantially as and for the purpose described.

In testimony that I claim the foregoing I have hereunto set my hand this 18th day of October, 1893.

GEORGE E. HUNTER.

Witnesses:
GEORGE S. PRINDLE,
CARLOS H. SMITH.